United States Patent
Dal Pozzo

(10) Patent No.: US 6,941,729 B2
(45) Date of Patent: Sep. 13, 2005

(54) METHOD AND MACHINE FOR PRODUCING BLISTER PACKS

(75) Inventor: Corrado Dal Pozzo, Imola (IT)

(73) Assignee: I.M.A. Industria Macchine Automatiche S.p.A., Ozzano Emilia (IT)

(*) Notice: Subject to any disclaimer, the term of this patent is extended or adjusted under 35 U.S.C. 154(b) by 0 days.

(21) Appl. No.: 10/492,585
(22) PCT Filed: Oct. 24, 2002
(86) PCT No.: PCT/IB02/04427
§ 371 (c)(1), (2), (4) Date: Apr. 14, 2004
(87) PCT Pub. No.: WO03/035478
PCT Pub. Date: May 1, 2003

(65) Prior Publication Data
US 2004/0244339 A1 Dec. 9, 2004

(30) Foreign Application Priority Data
Oct. 26, 2001 (IT) ................. BO2001A0650

(51) Int. Cl.[7] .......................... B65B 47/02; B29C 71/02
(52) U.S. Cl. .......................... 53/453; 53/559; 264/235
(58) Field of Search ................. 53/452, 456, 563, 53/453, 559, 560; 264/235, 555, 248, 249, 346, 900

(56) References Cited

U.S. PATENT DOCUMENTS 3,808,772 A * 5/1974 Turtschan ............... 53/141
3,851,441 A * 12/1974 Marchand ............... 53/116
4,506,495 A * 3/1985 Romagnoli ............ 53/559
4,627,221 A * 12/1986 Buchner ................. 53/425
4,750,318 A * 6/1988 Matsuzawa ............ 53/559
5,192,484 A * 3/1993 Matuzawa et al. ..... 264/555
5,201,163 A * 4/1993 Reil et al. ............... 53/410

* cited by examiner

Primary Examiner—Louis K. Huynh
Assistant Examiner—Paul Durand
(74) Attorney, Agent, or Firm—William J. Sapone; Coleman Sudol; Sapone PC

(57) ABSTRACT

A machine (M) for producing blister packs (10) includes unrolling means (3,7,21) for unrolling a band of heat-formable material from a bobbin (2) and for feeding the band (1) along a predetermined path (P) extending through subsequent stations (5,6,30,8,9,13), in which the band (1) is processed. The above-mentioned stations include a heating station (5), where the band (1) of heat-formable material is heated, a forming station (6), where a plurality of blisters (20) are formed on the band (1), a filling station (8), where the blisters (20) are filled with products, a sealing station (9), where the blister band (1a) is closed with a sealing band (11), and a cutting station (13), where the closed blister band (1ac) is cut into blister packs (10). A further heating station (30) is provided for heating the blister band (1a) along the path (P) upstream of the filling station (8), so as to heat the band (1a) to cause a thermal stabilization treatment of the blister band (1a).

9 Claims, 1 Drawing Sheet

METHOD AND MACHINE FOR PRODUCING BLISTER PACKS

FIELD OF THE INVENTION

The present invention relates to the production of blister packs from a blister band of heat-formable material in the so-called blistering machines.

BACKGROUND OF THE INVENTION

Currently, there are known blistering machines, which form blisters in a continuous band of heat-formable material and subsequently fill the blisters with products; the blister band, filled in this way with the products, is subsequently closed by welding a sealing band and then cut into single blister packs.

In particular, the band of heat-formable material is unwound from a bobbin and is driven along a horizontal plane between opposite plates of a heating station, and then it is fed through a forming station. In the forming station, suitable forming means act on the band, which has become deformable due to the heat action, so that blisters are formed for subsequent receiving of the products.

The blistering machines currently used are affected by a big problem deriving from the lack of planarity in the obtained blister packs, i.e. from undesired curving, mainly in the longitudinal direction, which the blister packs assume at the outlet of the cutting stations of the blistering machines.

The above problem derives from the expansion of the band of heat-formable material due to heating thereof necessary to form the blisters and to subsequent shrinkage of the band due to the return to the environment temperature.

The above-mentioned shrinkage or contraction of the heat-formable band is not uniform and causes considerable surface tensions of the band which provoke uncontrolled stretches, increased by the subsequent application of the sealing band and consequently determining the curving effect.

In particular, this damaging effect has been reported in case of blister band produced from heat-formable material such as polypropylene.

It is to be noted that the shrinkage of the above-mentioned band, and consequently, the curving effect of the blister packs obtained therefrom, lasts for a long time, with negative results affecting also the subsequent production steps, out of the blistering machine, e.g. during piling and/or subsequent packaging blister packs into the related boxes.

Moreover, the blister band uncontrolled stretching effect is also aesthetically unpleasant, specially if the not perfectly flat blister packs obtained from the above blister band, are put on sale separately instead of being closed inside a box or package.

SUMMARY OF THE INVENTION

The object of the present invention is to overcome the above described drawbacks and problems by proposing a method and a blistering machine for producing blister packs, which are perfectly flat and are not affected by undesired curvature.

A machine for producing blister packs, obtained according to the present invention, includes unrolling means for unrolling a band of heat-formable material from a bobbin and for feeding the band along a predetermined path, which extends through subsequent stations, in which the band is processed; said stations include a heating station, where the band of heat-formable material is heated, a forming station, where a plurality of blisters are formed on said band, a filling station, where said blisters are filled with respective products, a sealing station, where said blister band is closed with a sealing band, and a cutting station, where the closed blister band is cut into parts, each of which corresponds to a respective blister pack; the machine being characterized in that it includes another heating station which is aimed at heating the blister band and is situated along said path, upstream of said filling station.

BRIEF DESCRIPTION OF THE DRAWINGS

The enclosed FIGURE shows schematically the machine that carries out the method claimed herein.

BEST MODE OF CARRYING OUT THE INVENTION

Figure 1:
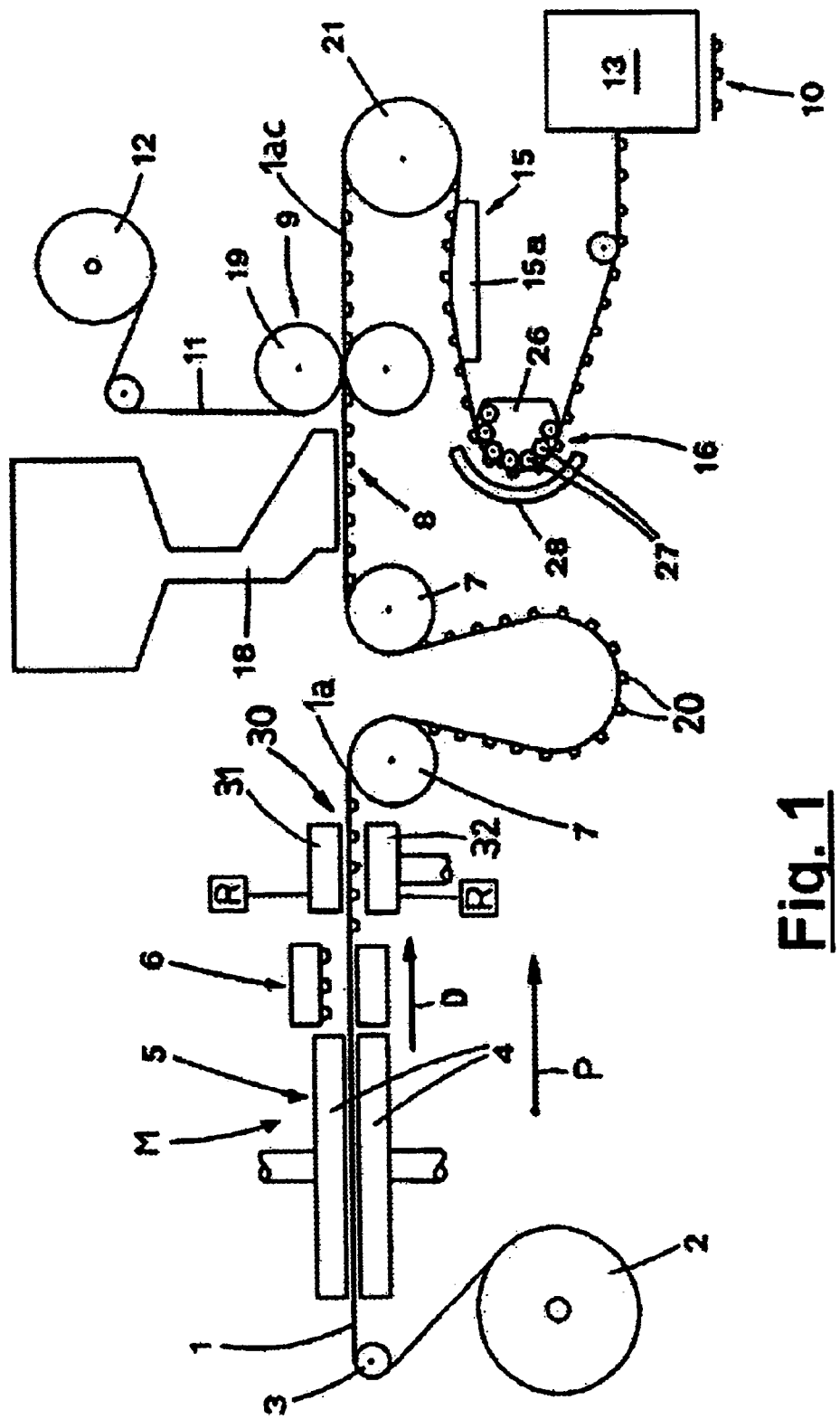

An enclosed FIGURE shows a front schematic view of a blistering machine M with some parts removed for sake of clarity, for producing blister packs 10 containing products, preferably pharmaceutical products (not shown), and obtained by cutting a band 1 of heat-formable material.

The band 1 of heat-formable material, preferably polypropylene, is unwound stepwise from a bobbin 2, which rotates about a horizontal axis, and is fed in a feeding direction D along a forward movement path P on a horizontal plane by an idle roll 3, between two opposite heating plates 4 of a station 5, where the band 1 is heated and subsequently, through a forming station 6, where blisters 20 are formed on the band 1 according to a known technique and by known means, so that a blister band 1a is defined, moving forward along the path P.

At the outlet of the forming station 6, the band 1a is engaged by a pair of feeding rolls 7, which define also a compensation section of the band 1a and then has the blisters 20 openings turned upwards in the following filling station 8, where known means 18 work to feed and fill products (not shown) into the relevant blisters 20.

The blister band 1a, filled with products, is then closed, still according to known technique, in a sealing station 9, where the band 1a, unwinding from a bobbin 12, rotating around a horizontal axis, is welded with a sealing band 11 by welding means 19 including mutual facing rolls, thus obtaining a closed blister band 1ac which, again, moves forward along the path P.

As shown in the enclosed FIGURE, directly downstream of the forming station 6, where the blisters 20 are formed along the path P, the machine M includes a station 30, where both the surfaces of the band 1a with blisters 20 are heated by two plates 31 and 32, suitably heated by known heating means R.

In particular, the plates 31 and 32 are flat plates, or otherwise, suitably shaped, and are situated respectively above and below the band 1a with the blisters 20. Preferably, the upper plate 31 is stationary, while the lower plate 32 is mounted on a support moving to and from the band 1a with blisters 20, perpendicularly to the direction D and in step relation with the blister band 1a forward movement.

The peculiar function of the heated plates 31 and 32 is to heat the band 1a with the already formed blisters 20 so as to cause an internal stress reducing heating of the band 1a, in other words to determine relaxing of the band fibers after its heat-forming, so as to settle and make stable the structure of the band 1a.

Therefore, there is no more possibility that the band 1a is subjected to further and undesired slow structural shrinkage or contraction, in particular due to the coupling with the sealing band 11, with consequent production of curved blister packs 10.

Numerous experimental tests made on different types of heat-formable material have confirmed that best stabilization of the band 1a structure and consequently, the production of blister packs 10 of best planarity, is obtained by heating the band 1a up to a temperature ranging from 100° C. to 120° C.

Still according to the enclosed FIGURE, downstream of the sealing station 9, between the sealing station 9 and a cutting station 13, where single blister packs 10 are obtained, the sealed blister band 1ac turns around a roll 21, which pulls and overturns the band 1ac. The roll 21 allows engagement of the band 1ac, with its flat face opposite to the face with the blisters openings and sealed with the band 11, by a guide 15a, with slightly curved surface and suitably cooled, on which the blister band 1ac slides and by a subsequent support 26.

The support 26 features, mounted thereon, a series of rollers 27 which rotate idling and on which the blister band 1ac slides.

A curved wall 28, suitably cooled faces the support 26. It is understood that what above, has been described as a pure, non-limiting example, therefore, possible variants of the invention remain within the protective scope of the present technical solution, as described above and claimed hereinafter.

What is claimed is:

1. A method for obtaining blister packages (10) comprising the following steps:

feeding a band (1) of heat-formable material along a predetermined forward movement path (P), heating said band (1) and subsequently, forming thereon a plurality of blisters (20), filling said blisters (20) of the so obtained blister band (1a) with products, closing said blister band (1a) with a sealing band and, cutting the blister band (1ac) closed with said sealing band (11) into parts forming single blister packs (10); and further heating the blister band (1a) at a further heating station before filling the blisters (20) with said products.

2. The method, according to claim 1, characterized in that said further heating is performed immediately after the blisters (20) have been formed on said band (1) of heat-formable material.

3. The method, according to claim 1, characterized in that during said further heating step, said blister band (1a) is heated to temperature up to 120° C.

4. The method, according to claim 1, characterized in that during said further heating step, said blister band (1a) is heated to temperature of at least 100° C.

5. A machine (M), for producing blister packs (10), comprising unrolling means (3, 7, 21) for unrolling a band of heat-formable material from a bobbin (2) and for feeding the band (1) along a predetermined path (P) extending through subsequent stations (5, 6, 30, 8, 9, 13), in which stations said band (1) is processed; said stations including:

a heating station (5), where the band of heat-formable material is heated;

a forming station (6), where a plurality of blisters (20) are formed on said band (1);

a filling station (8), where said blisters (20) are filled with products;

a sealing station (9), where said blister band (1a) is closed with a sealing band (11); and a cutting station (13), where the closed blister band (1ac) is cut into parts forming single blister packs (10); and a further heating station (30) for heating blister band (1a), said further heating station being situated along said path (P) upstream of said filling station (8).

6. The machine, according to claim 5, characterized in that said further heating station (30) is situated along said path (P) downstream of said forming station (8), where said blisters (20) are formed on the heat-formable band (1).

7. The machine, according to claim 5, characterized in that said further heating station (30) includes heating means (31, 32, R) for heating said blister band (1a) to temperature ranging from 100° up to 120° C.

8. The machine, according to claim 7, characterized in that said heating means (31, 32, R) include two heated plates (31, 32), arranged on opposite sides with respect to the blister band (1a) in step relation moving along said path (P).

9. The machine, according to claim 8, characterized in that at least one plate (32) of said plates (31, 32) is mounted for movement alternately to and from said blister band (1a) in step relation with the motion of said blister band.

* * * * *